US011713810B2

(12) United States Patent
Mock et al.

(10) Patent No.: US 11,713,810 B2
(45) Date of Patent: Aug. 1, 2023

(54) SYSTEMS AND METHODS FOR CONFIGURING SELECTIVE COUPLERS IN A MULTI-SPEED TRANSMISSION

(71) Applicant: Allison Transmission, Inc., Indianapolis, IN (US)

(72) Inventors: Isaac Mock, Martinsville, IN (US); Jason Ellis, Clayton, IN (US); James Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 229 days.

(21) Appl. No.: 17/166,427

(22) Filed: Feb. 3, 2021

(65) Prior Publication Data
US 2022/0243812 A1 Aug. 4, 2022

(51) Int. Cl.
| | |
|---|---|
| *F16D 25/02* | (2006.01) |
| *F16H 63/48* | (2006.01) |
| *F16H 63/34* | (2006.01) |
| *F16H 61/02* | (2006.01) |
| *B60T 1/00* | (2006.01) |
| *F16D 48/02* | (2006.01) |

(52) U.S. Cl.
CPC ......... *F16H 63/3483* (2013.01); *F16D 25/02* (2013.01); *F16H 61/0206* (2013.01); *B60T 1/005* (2013.01); *F16D 25/14* (2013.01); *F16H 63/48* (2013.01)

(58) Field of Classification Search
CPC .. F16H 63/3483; F16H 63/48; F16H 61/0206; F16D 25/02; F16D 25/14; F16D 25/063; F16D 13/04; F16D 2127/06; B60T 1/005
See application file for complete search history.

(56) References Cited

U.S. PATENT DOCUMENTS

| | | | |
|---|---|---|---|
| 3,205,863 A | 9/1965 | Rhoades | |
| 3,503,280 A | 3/1970 | Bopp | |
| 3,831,463 A | 8/1974 | Ahlen | |
| 5,030,181 A | 7/1991 | Keller | |
| 5,462,145 A | 10/1995 | Gimmler | |
| 5,465,819 A | 11/1995 | Weilant et al. | |
| 5,515,955 A | 5/1996 | Victoria et al. | |
| 5,638,930 A | 6/1997 | Parsons | |
| 5,711,192 A * | 1/1998 | Vasilantone | B23Q 16/102 74/125.5 |

(Continued)

FOREIGN PATENT DOCUMENTS

| | | |
|---|---|---|
| DE | 4038731 C2 | 7/1994 |
| DE | 4134421 C2 | 6/1995 |

(Continued)

*Primary Examiner* — Huan Le
(74) *Attorney, Agent, or Firm* — Faegre Drinker Biddle & Reath LLP

(57) ABSTRACT

A transmission system efficiently performs efficiently and also provides the ability to perform full-power shifts. For example, a secondary clutch actuator, independent of fluid actuation, may eliminate the need for a pump to continuously provide high pressure during regular vehicle operation such that high pressures are only required during a shift event. This eliminates the need for energy at the pump to maintain application of the clutch, thereby allowing such energy to be used of other systems in the EV or to facilitate increased vehicle range.

19 Claims, 12 Drawing Sheets

(56) References Cited

U.S. PATENT DOCUMENTS

| | | | |
|---|---|---|---|
| 5,782,331 | A | 7/1998 | Bailly et al. |
| 5,868,642 | A | 2/1999 | Kobayashi |
| 7,100,756 | B2 | 9/2006 | Kimes et al. |
| 7,156,217 | B2 | 1/2007 | Raber |
| 8,109,376 | B2 * | 2/2012 | Bek .................... F16D 25/0638 |
| | | | 192/114 R |
| 9,662,966 | B2 | 5/2017 | El Baraka et al. |
| 10,473,542 | B2 | 11/2019 | Hawarden et al. |
| 10,479,180 | B2 | 11/2019 | Colavincenzo et al. |

FOREIGN PATENT DOCUMENTS

| | | |
|---|---|---|
| DE | 4202595 C2 | 3/1997 |
| JP | 2006329369 A | 12/2006 |

* cited by examiner

SYSTEMS AND METHODS FOR CONFIGURING SELECTIVE COUPLERS IN A MULTI-SPEED TRANSMISSION

TECHNICAL FIELD

The present disclosure relates to a multi-speed transmission and, in particular, to selective couplers for a multi-speed transmission.

BACKGROUND

A transmission is an apparatus through which power and torque can be transmitted from a vehicle's power unit to a load-bearing device such as a drive axis. Motor vehicle powertrains typically include a transmission interposed between the engine and the differential providing torque to the vehicle's driven wheels. Transmissions typically include a variety of gears, shafts, and clutches that transmit torque through the transmission at finite, stepped gear ratios. Transmissions provide a manual or automated selection of speed ratios between the speed of rotation of the transmission input shaft and the rotation speed of the output shaft resulting in output torque multiplication or reduction with the goal of matching vehicle on-ground torque and speed demands to the engine's output speed and torque capabilities while maintaining engine operating parameters within optimum fuel efficiency and emission ranges.

A variety of different types of transmissions are used in motor vehicles. Each of these transmissions deliver multiple speed ratios including manual, automated manual, dual clutch, and various types of planetary transmissions. Some transmissions are dual clutch transmissions, which employ two friction clutches along with dog clutches and synchronizers to achieve dynamic speed and torque ratio shifts by alternating between one friction clutch and the other and several dog clutch/synchronizers where the synchronizers are preset for the oncoming ratio to actually make the dynamic speed/torque ratio shift.

With electrical vehicle (EV) powertrains, efficiency is important and often comes at the expense of the EVs performance. For example, as compared to most conventional vehicles with a full tank of fuel, EVs have a shorter drive range per charge of the battery, and fully recharging the battery can take more time than is required to refill a fuel tank. More efficiency in EVs means longer drive range using the same amount of batteries (e.g., the same amount of weight). In order to perform power shifts in a transmission, a wet friction clutch is often used, which in typical applications means a high-pressure pump will be required to continuously provide high pressure to one or more fluid circuits of the transmission during vehicle operation. For example, a friction clutch and a high-pressure hydraulic pump and fluid circuit allow full-power shifts in a transmission, but does not provide high efficiency in an EV vehicle because the pump is continuously run to provide high pressure to maintain the friction clutch in an engaged state. On the other hand, a dog clutch or a synchronizer with an actuator provide efficiency (e.g., no pump losses) but, in typical applications, provide no ability to do full-power shifts unless there are multiple traction motors used.

SUMMARY

The present disclosure provides for efficient transmission operation while also providing the ability to perform full-power shifts. For example, a secondary clutch actuator, independent of fluid actuation, may eliminate the need for a pump to continuously provide high pressure during regular vehicle operation such that high pressures are only required during a shift event. This eliminates the need for energy at the pump to maintain application of the clutch, thereby allowing such energy to be used by other systems in the EV or to facilitate increased vehicle range.

In an embodiment of the present disclosure, a torque transmitting device is provided for transmitting torque from a driving element to a driven element. The torque transmitting device includes an indexer configured to move between an engaged state in which the torque transmitting device is engaged with the driven element and a disengaged state in which the torque transmitting device is disengaged with the driven element, an actuator comprising a hydraulic pump and a piston operatively connected to the hydraulic pump, the hydraulic pump being configured to selectively apply a hydraulic pressure to a first side of the piston such that the piston moves the indexer between the engaged state and the disengaged state, a lock operatively connected to the indexer, the lock engaging the indexer in a first configuration corresponding to the engaged state of the indexer and the lock engaging the indexer in a second configuration corresponding to the disengaged state, the first configuration different from the second configuration, and a biasing element positioned configured to provide a biasing force to the indexer into the engaged state, such that the biasing element is operable to mechanically hold the indexer in the engaged state absent the hydraulic pressure.

In another embodiment of the present disclosure, a method for applying a torque transmitting device in a transmission is provided. The method includes applying a hydraulic pressure to a first side of an indexer to transition the torque transmitting device from a disengaged state to a fluid-engaged state activated by the hydraulic pressure, removing the hydraulic pressure from the first side of the indexer, and mechanically holding the torque transmitting device in a locked-engaged state subsequent to removing the hydraulic pressure from the first side of the indexer.

In yet another embodiment of the present disclosure, a method for applying a torque transmitting device in a transmission is provided. The method includes activating, non-mechanically, an actuator to transition the torque transmitting device from a disengaged state to a first engaged state, deactivating, non-mechanically, the actuator, and mechanically holding the torque transmitting device in a second engaged state subsequent to deactivating, non-mechanically, the actuator.

While multiple embodiments are disclosed, still other embodiments will become apparent to those skilled in the art from the following detailed description, which shows and describes illustrative embodiments. Accordingly, the drawings and detailed description are illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
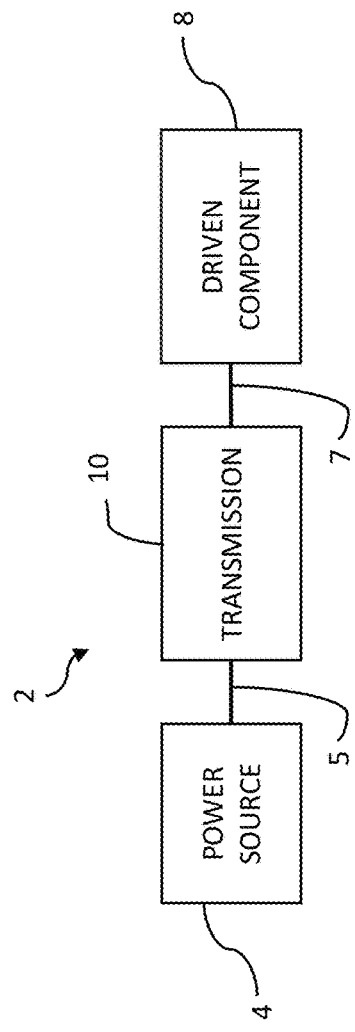
FIG. 1 is a schematic illustration of a drivetrain arrangement according to embodiments of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the illustrated transmission embodiments, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other to selectively transmit rotation and torque between the two or more components.

Referring to FIG. 1, an exemplary drivetrain arrangement 2 is shown. In arrangement 2, a power source 4 provides power to a transmission 10 through an output member 5 of the power source, such as a rotating shaft. The transmission 10 in turn provides power to a driven component 8 through an output member 7, such as a rotating shaft. Exemplary power sources 4 include internal combustion engines, electric motors, and other sources of mechanical output power. Exemplary driven components 8 include vehicle differentials, ground engaging members, pumps, drills, and other devices driven by mechanical power.

As used herein, the term multi-speed automatic transmission is defined as a transmission 10 being configurable in a plurality of forward speed ratios, such that the output member 7 of the transmission can rotate at various speed ratios relative to the input member of the transmission 10 coupled to the output member 5 of power source 4. Such speed ratios may be controlled through a transmission control circuit, which may include a shift logic which includes configuration settings to configure the components of multi-speed automatic transmission in respective forward speed ratios. Multi-speed automatic transmissions may also include one or more reverse speed ratios. Exemplary multi-speed automatic transmissions 10 include automatic transmissions and automated manual transmissions.

Figure 2:
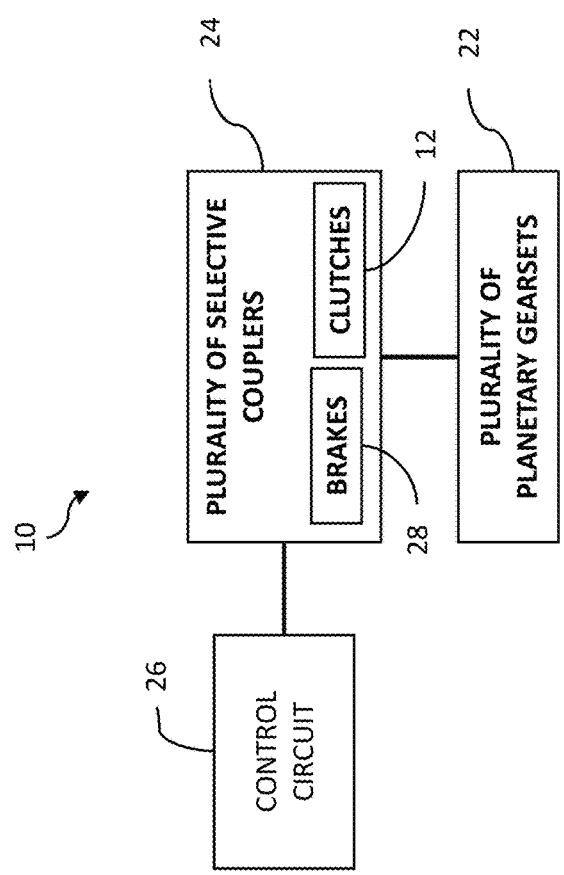
FIG. 2 is a schematic illustration of a transmission according to embodiments of the present disclosure.

An exemplary multi-speed automatic transmission 10 is represented in FIG. 2. Multi-speed automatic transmission 10 includes a plurality of planetary gearsets 22 having a plurality of selective couplers 24 which are controlled by transmission control circuit 26 to configure multi-speed automatic transmission 10 in the various forward speed ratios and/or reverse speed ratios. Each planetary gearset 22 includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn engaged with the teeth of the ring gear. Each of these components may also be referred to as a gearset component. Each of the sun gear, the planet carrier, and the ring gear of a respective planetary gearset of the plurality of planetary gearsets 22 may be fixedly coupled to one or more of the input member of the multi-speed automatic transmission; the output member of the multi-speed automatic transmission; another one or more of the sun gear, the planet carrier, and the ring gear of one or more of the plurality of planetary gearsets; one or more of the selective couplers; a stationary member of the transmission, such as a housing; and combinations thereof.

It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

A first exemplary selective coupler 24 is a clutch 12. A clutch 12 couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler 24 is a brake 28. A brake 28 couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers 24 may be actively controlled devices or passive devices. Exemplary actively controlled devices include hydraulically actuated clutch or brake elements and electrically actuated clutch or brake elements. As shown in FIG. 2, selective couplers 24 of automatic transmission 10 may include a combination of clutches 12 and/or brakes 28.

In addition to coupling through selective couplers 24, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

One or more rotating components, such as shafts, drums, and other components, may be collectively referred to as an interconnector when the one or more components are fixedly coupled together. Interconnectors may further be fixedly coupled to one or more gearset components of the plurality of planetary gearsets 22, and/or to one or more selective couplers 24, as required or desired for a particular application.

Other exemplary multi-speed automatic transmissions 10 include automated manual transmissions. One exemplary automated manual transmission includes at least one gear carried by the input shaft, at least one gear carried by at least one countershaft, at least one gear carried by the output shaft, and a plurality of synchronizers or couplers, such as clutches, that couple together various arrangements of the gears and/or shafts to achieve the plurality of forward speed ratios of the output shaft to the input shaft. Exemplary automated manual transmissions include both sliding mesh transmissions and constant mesh transmissions. Exemplary multi-speed automatic transmissions include both transmissions which continuously provide power from the input shaft to the output shaft during shifting and transmissions wherein power from the input shaft to the output shaft is interrupted during shifting.

The present disclosure provides devices, systems, and methods that provide efficient operation while also providing the ability to perform full-power shifts. Embodiments of the present disclosure eliminate the need for a pump to continuously provide high pressure during regular vehicle operation and only requires such high pressures during a shift event. For example, to apply a clutch, fluid pressure is applied in the typical manner, but when sync speed is achieved, the applied pressure is modified (e.g., increased) to reposition the clutch to engage a mechanical lock after which the clutch may remain applied without the applied fluid pressure. The fluid pressure can then be removed, and as a result, the EV operates more efficiently as compared to continuously providing high fluid pressure to maintain actuation of the clutch. An advantage, among others, of this arrangement is the ability to efficiently perform power shifts because, in contrast to typical applications, no energy is needed at the pump to maintain application of the clutch. Under these circumstances, instead of diverting energy from the battery to cause the pump to produce high pressure to maintain application of the clutch, this energy can be preserved and/or potentially used in other applications. For example, this energy may be reserved for use of other systems in the EV or to facilitate increased vehicle range. In addition, when the present disclosure includes multiple clutches, they may be used to apply park to the transmission, which may result in eliminating the need for a separate parking system within the transmission.

Figure 3:
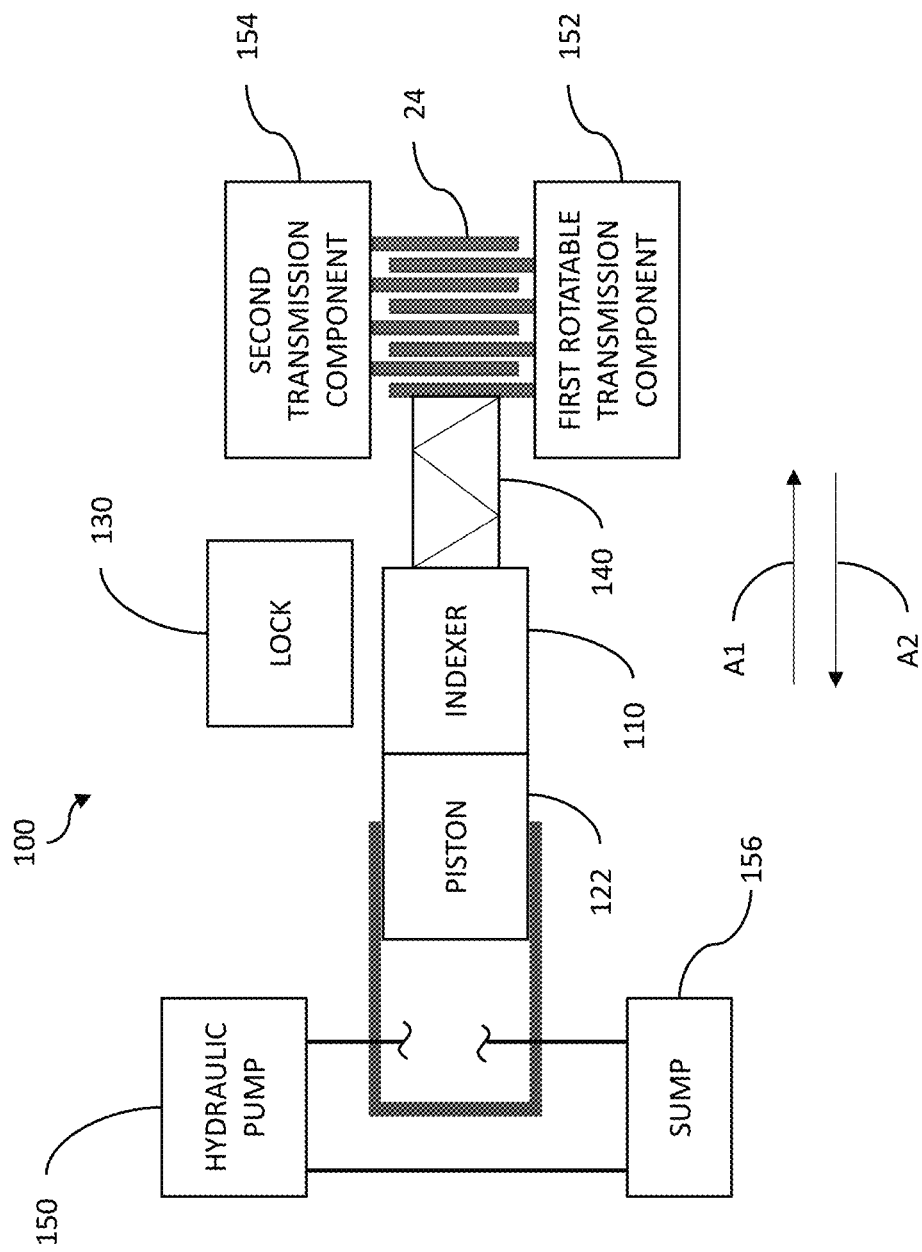
FIG. 3 is a schematic illustration of a torque transmission device according to embodiments of the present disclosure, shown in a disengaged configuration.
Figure 4:
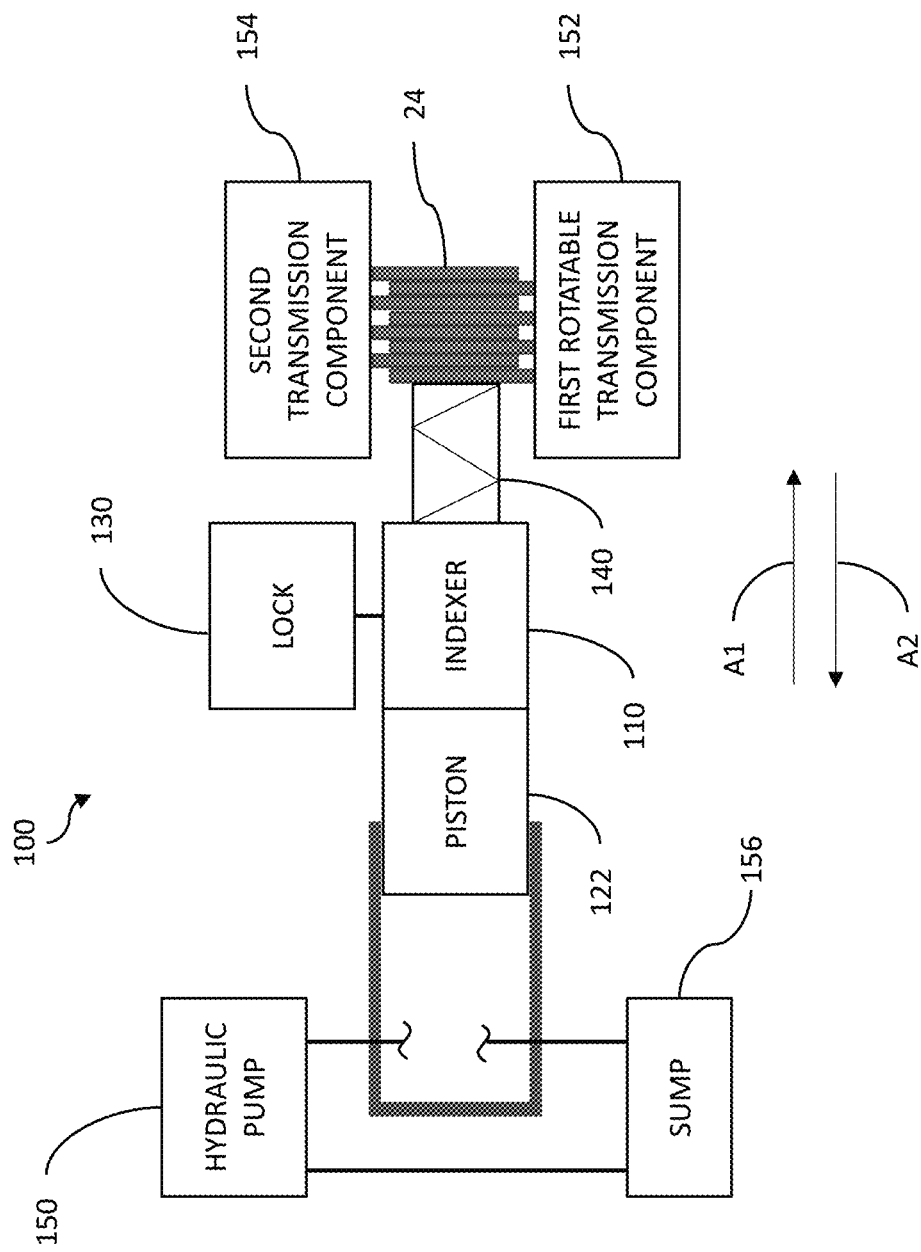
FIG. 4 is a schematic illustration of the torque transmission device of FIG. 3, shown in a fluid-engaged configuration.
Figure 5:
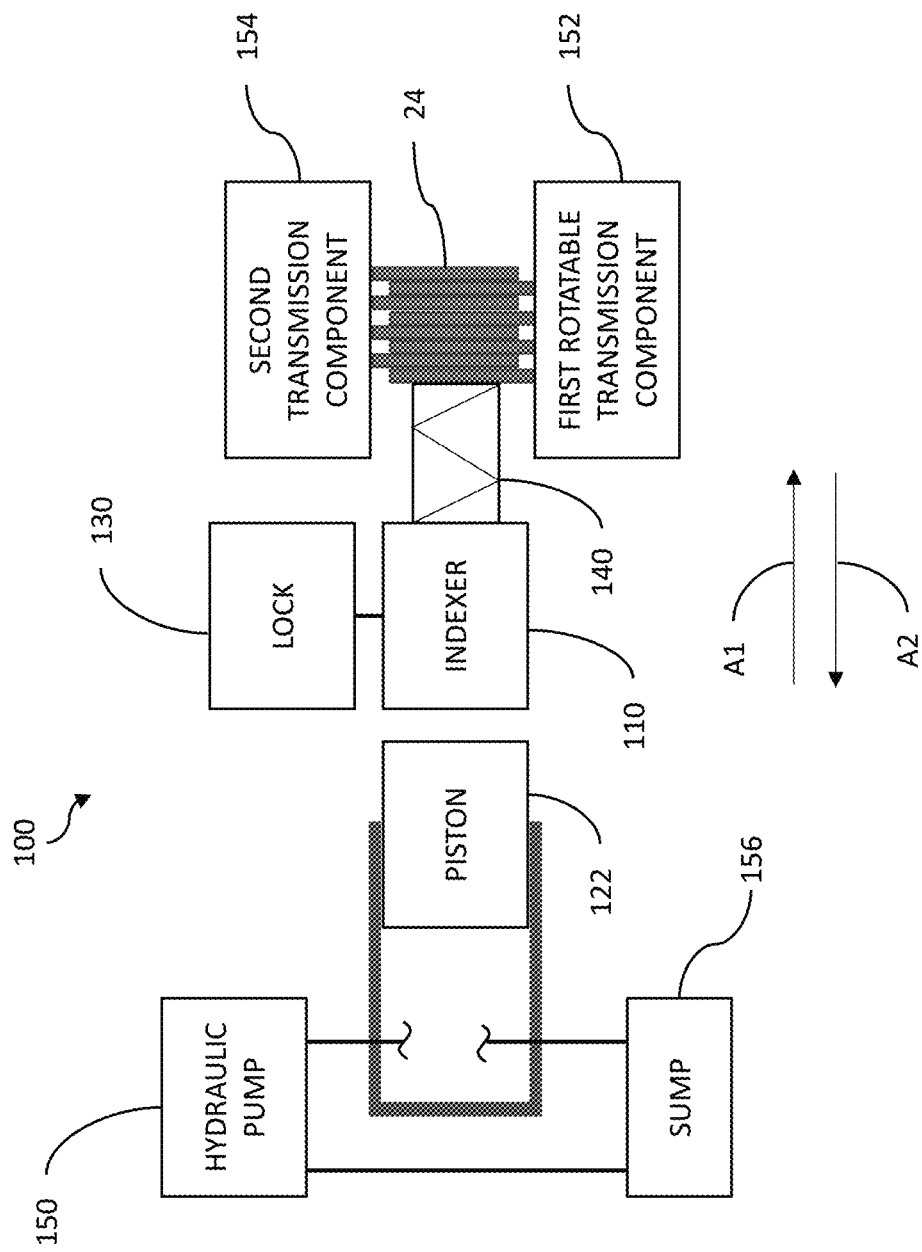
FIG. 5 is a schematic illustration of the torque transmission device of FIG. 3, shown in a locked and engaged configuration.

FIGS. 3-5 schematically illustrate torque transmission device 100 in various configurations, including disengaged (FIG. 3), engaged by fluid pressure (FIG. 4), and engaged by a locking mechanism such as lock 130 (FIG. 5).

FIG. 3 is a schematic illustration of a torque transmission device 100 in a disengaged configuration. In this configuration, piston 122 in a seated or otherwise retracted position in the absence of pressurized fluid from pump 150 biasing piston toward an actuated position. Indexer 110 is biased into abutting contact with piston 122, e.g., by biasing element 140, and selective coupler 24 (e.g., clutch 12 and/or brake 28) is disengaged. With selective coupler 24 disengaged, first transmission component 152 and second transmission component 154 are decoupled such that negligible or no power transmission between components 152, 154 occurs. In addition, lock 130 is disengaged from indexer 110 and piston 122 in the configuration of FIG. 3, such that lock 130 does not affect the engagement of coupler 24, as further discussed below).

FIG. 4 is another illustration of the torque transmission device 100 shown in FIG. 3, except that the device 100 has been reconfigured into a "fluid-engaged" configuration in which fluid pressure from pump 150 is used to actuate device 100. In this configuration, piston 122 has been actuated by the introduction of pressurized fluid from pump 150. During this actuation, piston 122 advances outwardly along direction A1 toward selective coupler 24, while also providing a force on indexer 110 and simultaneously advancing indexer 110 along direction A1 against the countervailing biasing force of biasing element 140. This movement causes selective coupler 24 to be actuated by pressure exerted by biasing element 140, creating a force-transmitting coupling between transmission components 152, 154.

In order to maintain fluid pressure to keep piston 122 and indexer 110 positioned in the fluid-engaged configuration of FIG. 4, hydraulic pump 150 may provide continuous pressurized flow to the piston, and a commensurate flow of fluid may also discharge to sump 156. Thus, pump 150 must remain energized and operational in this configuration, because a loss of fluid pressure would allow biasing element 140 and a piston-return biasing element (not shown) to advance indexer 110 and piston 122 back to their disengaged positions along direction A2 (as shown in FIG. 3), thereby allowing coupler 24 to also disengage.

However, in the fluid-engaged position of FIG. 4, lock 130 may be engaged as shown to exert a mechanical force on indexer 110. Lock 130 is therefore configured to hold indexer 110 in the engaged position of FIG. 4 regardless of whether fluid pressure from pump is maintained. This retention of indexer 110 in the engaged position maintains the pressure on coupler 24 by biasing element 140, such that coupler 24 remains the force-transmitting coupling between transmission components 152, 154. This mechanically engaged position is referred to as a "locked-engaged" position herein.

Turning to FIG. 5, it can be seen that the locked-engaged configuration of torque transmission device 100 allows piston 122 to withdraw along direction A2 in the absence of fluid pressure from pump 150, while still maintaining the actuated condition of selective coupler 24. When pump 150 deactivates, the pressurized fluid bearing upon piston 122 drains to sump 156. This allows piston 122 to move along direction A2, e.g., under the biasing force of a piston-return spring (not shown). As it does so, indexer 110 is retained in its actuated position by lock 130, which mechanically retains indexer in position even without fluid pressure or other continuous energy inputs. Thus, pump 150 can be deactivated without disengaging selective coupler 24. This independence between the presence of fluid pressure from pump 150 and actuation of selective coupler 24 is a characteristic of the "locked-engaged" position shown in FIG. 5.

When lock 130 is disengaged from indexer 110, and in the continued absence of pressurized fluid from pump 150, biasing element 140 advances indexer 110 back into contact with piston 122 and away from engagement with selective coupler 24. In addition, the piston-return spring (not shown) previously caused piston 122 to fully retract (FIGS. 3 and 5). This creates sufficient spatial clearance to allow full disengagement of coupler 24, in which biasing element 140 is allowed to fully expand, and springs or biasing elements urging disengagement of the respective plates of coupler 24 are also allowed to actuate, spreading the plates apart and disengaging torque transmission between transmission components 152, 154. This returns torque transmission device 100 to the disengaged state shown in FIG. 3.

Figure 6:
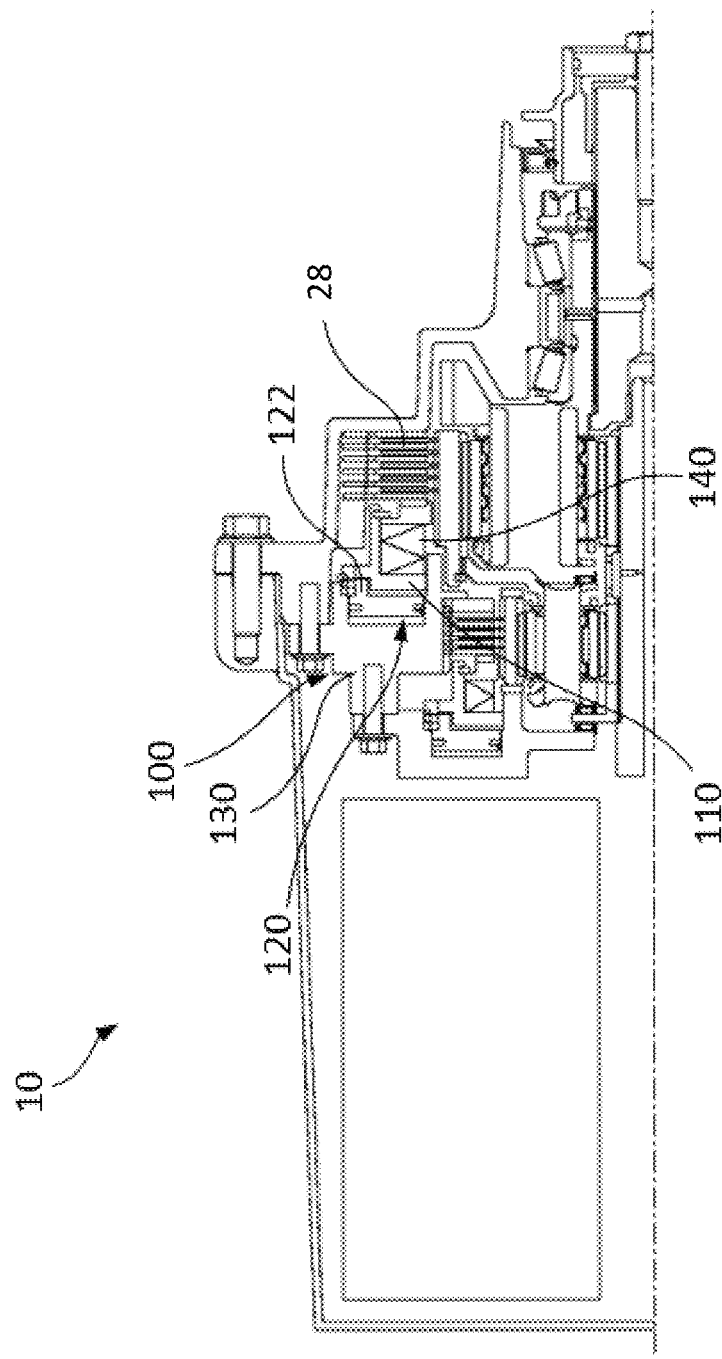
FIG. 6 is a schematic view of a transmission according to embodiments of the present disclosure.

Turning now to FIG. 6, transmission 10 is shown according to an illustrative embodiment of the present disclosure. As noted above with respect to FIG. 1, vehicles typically include a drivetrain arrangement 2 having a power source 4 (e.g., an internal combustion engine and an electric motor), a transmission 10 coupled to the power unit, and a driven component or load 8 (e.g., drive wheels, an auxiliary gearbox (e.g. a transfer case or drop box), or a power take-off device) coupled to the transmission 10. Rotational power is generated by the power source 4 and transmitted to the transmission 10 via a power unit output shaft 5, included in the power source 4. The output shaft 5 is coupled to a transmission input shaft included in the transmission 10. In addition, rotational power from the transmission 10 is transmitted from a transmission output shaft 7 to the driven component or load 8. The transmission 10 ensures the controlled application of rotational power generated by the power source 4 to the driven component 8.

Transmission 10 shown in FIG. 6 is configured for use in an alternative type of application in which a rotatable component is subjected to a selective braking force which arrests rotation of the component. FIG. 6 shows one illustrative torque transmitting device 100 operable to selectively transmit torque to a driven element such that the driven element is slowed or stopped. The torque transmitting device 100 of FIG. 6 includes an indexer 110, an actuator 120, and a lock 130. The actuator 120 may include a hydraulic pump (not shown) and a piston 122 operatively connected to a source of pressurized fluid produced by the hydraulic pump. The lock 130 mechanism is configured to movably receive the piston 122 and the indexer 110, such that the piston 122 and the indexer 110 are both received within a fluid cavity of the lock 130, with piston 122 positioned to receive a motive force from fluid pressure and transmit such motive force to indexer 110. Further details of these components will be discussed hereinafter.

In the illustrative embodiment of FIG. 6, torque transmitting device 100 is employed to apply and release a brake 28 of the transmission 10. As noted above, the illustrated brake 28 is one among many selective couplers 24 (FIGS. 3-5) which can be used in accordance with the present disclosure.

For purposes of the discussion below, brake 28 will be discussed with reference to the illustrated embodiment shown in FIG. 6, it being understood that brake 28 may be a clutch or any other selective coupler described herein.

Brake 28 is a multi-disc component employing a series of friction discs placed between steel plates housed within a drum and a biasing element (e.g. a set of springs adjacent to respective discs) operably connected to the friction discs. In an example, when fluid pressure is applied to the brake 28 (e.g., via the piston 122), an actuator biasing element 140 is compressed to forcibly move the discs into contact against the biasing force of the biasing elements adjacent the discs, thereby frictionally locking the discs together creating a rotational coupling between a driven element (e.g., the driven component 8 of FIG. 1) and a fixed or stationary component such as a frame. When the fluid pressure is removed, piston 122 is allowed to retract under the biasing force of the piston return spring (not shown). This creates running clearance for the biasing element 140 to return brake 28 to a non-engaged state in which the discs are allowed to move out of contact and disengage the rotatable coupling, such that the driven element can again rotate relative to the fixed component with negligible or no torque transmission therebetween.

Figure 7:
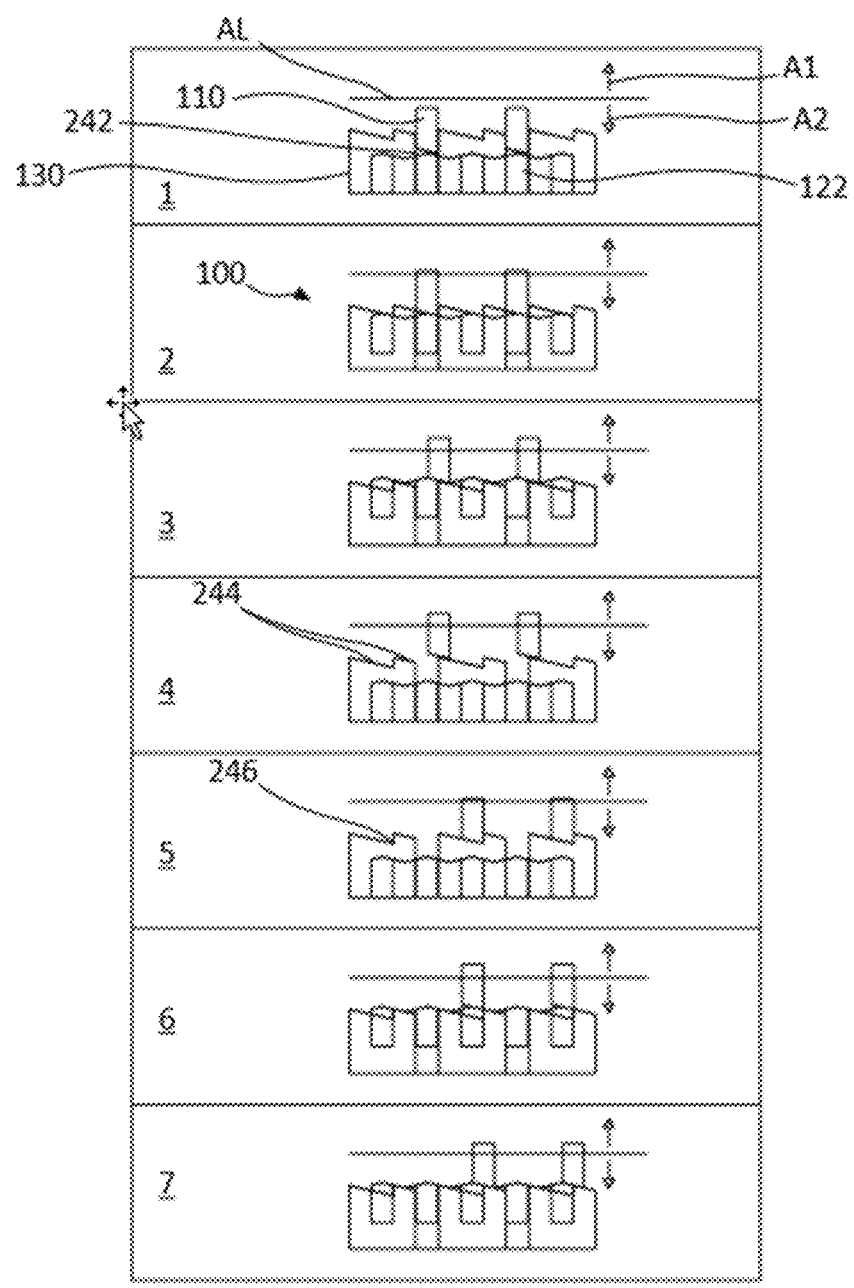
FIG. 7 is a schematic illustration of an interface of an indexer, a piston, and a lock at several stages of operation according to embodiments of the present disclosure.

FIG. 7 is a schematic illustration of an interface of the indexer 110, the piston 122, and the lock 130, showing a series of stages through which the torque transmitting device 100 may move between an engaged state in which clutch pack 12 (or another selective coupler 24) is applied, and a disengaged state in which the clutch pack 12 (or another selective coupler 24) is unapplied. In this illustration, each stage of movement is denoted with a number 1-7 (but should not be construed as limit this disclosure to a specific sequence of stages). Application line AL represents a threshold at which the clutch pack 12 moves between being applied (in the engaged state) and being unapplied (in the disengaged state). Upward arrow A1 represents movement toward application line AL and the engaged state, and downward arrow A2 represents movement away from application line AL and toward the disengaged state.

In the example of FIGS. 6 and 7, the lock 130 is stationary (i.e., does not rotate or translate), while the piston 122 and the indexer 110 may move in the direction of upward arrow A1 or in the direction of downward arrow A2. In this way, when the piston 122 is driven by pressurized fluid into contact with the indexer 110, the indexer 110 and piston 122 are moved toward a fluid-engaged state (FIG. 4), represented in FIG. 7 as movement in the direction of upward arrow A1. The piston 122 may then be retracted to its disengaged state represented in FIG. 7 as movement in the direction of downward arrow A2. However, in some of the illustrated stages and as further discussed below, the indexer 110 is locked in its engaged position such that the torque transmitting device 100 is in an engaged state even without active contact between the piston 122 and the indexer 110. Under these circumstances, the piston 122 may still move in directions between upward arrow A1 and downward arrow A2 and may again contact the indexer 110 if movement of the piston 122 travels far enough in the direction of upward arrow A1 to contact the indexer 110 while in the locked position. For sake of clarity in FIG. 7, only selected structures are assigned reference numbers in selected stage views, it being understood that the structures assigned reference numbers in any stage view are also present in all the other stage views.

Both engagement and disengagement of the torque transmitting device 100 may involve applying and removing fluid pressure as noted above. At stage 1 of FIG. 7, no fluid pressure is applied, such that the torque transmitting device 100 is in a "resting" state where both the piston 122 and indexer 110 are meshed within grooves 242 of the lock 130, and the indexer 110 is in an unlocked position. In this arrangement, the torque transmitting device 100 is in a disengaged state as also depicted, for example, in FIG. 3.

At each of stages 2-7, the torque transmitting device 100 is in an engaged state, as depicted by the intersection of application line AL and indexer 110. In stages 2-5, the torque transmitting device 100 is shown in a first cycle from disengaged (stage 1) to fluid-engaged (stage 2) to locked-engaged (stage 5). In stages 6-7, torque transmitting device 100 is shown transitioning from locked-engaged toward disengaged.

To initially apply the clutch pack as depicted in stage 2, pressure is applied to the piston 122, which pushes the indexer 110 toward the clutch pack (in the direction of upward arrow A1 as shown in FIG. 7) to then compress the biasing elements 140 and thereby compress and actuate the plates of clutch pack 12. At this stage, both the piston 122 and indexer 110 remain meshed within grooves 242 of the lock 130.

At stage 3, the piston 122 is moved further toward the clutch pack (e.g., via application of additional pressure as compared to stage 2), and the piston 122 remains meshed within grooves 242 of the lock 130. At stage 3, however, the indexer 110 has advanced out of grooves 242 of the lock 130, and has moved out of registration with the grooves 242 as indexer 110 transitions toward a locked position (e.g., by sliding along the surface of slide 244).

At stage 4, fluid pressure upon piston 122 has been removed, causing the indexer 110 to slightly retract (in the direction of downward arrow A2) as it slides further along slide 244. In this way, the geometry of the lock 130 guides the indexer 110 toward its locked position, where it is prevented from further movement by engagement with a catch 246 at the bottom of slide 244 as shown in stage 5.

At stage 5, the biasing element 140 is less compressed than at stage 3 as the piston 122 is retracted. However, the clutch pack 12 remains in an engaged configuration in the absence of fluid pressure because the indexer 110 is in its locked position. This forms the "locked engaged" configuration also shown and described above with respect to FIG. 5.

To release the clutch pack from the locked-engaged configuration and allow the torque transmission device 100 to return to a disengaged configuration, pressure is again applied to the piston 122 to thereby push the indexer 110 over the catch 246. This configuration is depicted at stage 6. Then, referring to stage 7, the indexer 110 is allowed to slide down the next adjacent slide 244 toward registration with the next adjacent groove 242. When the indexer 110 meshes within groove 242, an unlocked position is achieved and, after pressure behind the piston 122 is released (as shown at stage 1), the torque transmission device 100 is in its disengaged configuration. Stages 1-7 may be repeated (in part or in whole) as necessary for a desired mode of vehicle operation.

As is apparent from FIG. 7, while motion of the piston 122 facilitates axial movement of the indexer 110, geometry of the piston 122 and the indexer 110 may facilitate rotational movement of the indexer 110. In embodiments, mating surfaces of the piston 122 and the indexer 110 may not include complementary geometry. For example, a first side of the indexer 110 may include a first series of ridges axially protruding in the aft direction (see, e.g., feature B in FIG. 10), and a forward side of the piston 122 may include a second series of ridges protruding in the forward direction (see, e.g., feature C in FIG. 9). In the illustrated embodiment, the first series of ridges B are complementary to the second series of ridges C. When the indexer 110 and the piston 122 are gears as discussed further hereinafter, each of the first and second series of ridges B, C may form a ring of ridges formed upon a correspondingly ring-shaped surface of their respective components 110, 122. In one exemplary embodiment, each ridge in the first series of ridges B and the second series of ridges C may have a triangular profile forming similar angles with their respective sides. In this way, together, the first series of ridges B and the second series of ridges C form a collective series of surfaces that either urge or resist relative rotation of indexer 110 and piston 122 depending on their relative positioning. That is, the indexer 110 is urged to rotate relative to the piston 122 if ridges in the first series of ridges B are not registered and seated with the ridges in the second series of ridges C, but the indexer 110 is urged to resist such rotation when ridges B, C are registered and seated. In embodiments, each ridge in the first series of ridges B and the second series of ridges C may define similar angles to that of the slide 244 so as to induce rotation of indexer 110 as it transitions away from a prior groove 242 (as shown in stage 3 of FIG. 7) and, later, toward the next groove 242 (as shown in stage 6 of FIG. 7).

Figure 8:
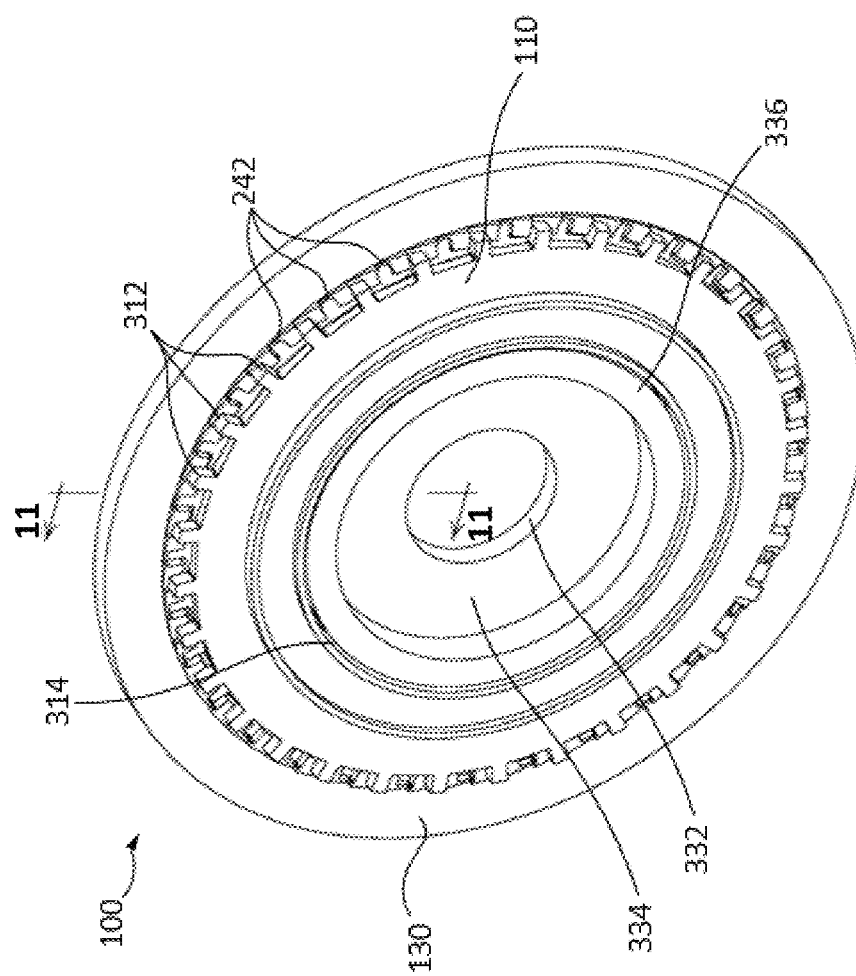
FIG. 8 is a perspective view of the torque transmitting device assembled according to embodiments of the present disclosure.

Turning now to FIG. 8, the torque transmitting device 100 is shown assembled with the indexer 110 in a locked position. As illustrated, the lock 130 is a gear housing having a central lock bore 332 extending axially through an annular inner surface 334 of the lock 130 along a central axis of the lock 130. A shoulder 336 extends axially away from the inner surface 334 of the lock 130. As illustrated, the indexer 110 is a gear with teeth 312 shaped to interfit or mesh within corresponding shaped grooves 242 in the lock 130. Indexer 110 includes a central indexer bore 314 that extends axially through the indexer 110 and that is sized to fit over the outer surface of the shoulder 336 formed in the lock 130. When the teeth 312 are interfitted or meshed within the grooves 242, the indexer 110 is rotationally fixed to the lock 130.

As alluded to above, movement of the indexer 110 by the piston may correspond to the torque transmitting device 100 moving between an engaged state and a disengaged state. Such movement may respectively correspond to the torque transmitting device 100 transmitting or not transmitting torque between the driving element (e.g., the power source 4 shown in FIG. 1) and the driven element (e.g., the vehicle load or other driven component 8 shown in FIG. 1).

As discussed further hereinafter, the piston 122 may apply force to a first side of the indexer 110. In the embodiment of FIG. 6, the indexer 110 may include a transmission side and an engine side, and the first side receiving force from the piston 122 is the transmission side. Applying and removing force to the first side of the indexer 110, such as by actuation of the piston 122, causes movement of the indexer 110 relative to the lock 130. For example, the indexer 110 may be configured to move between an engaged state in which the torque transmitting device 100 is in torque-transmitting relationship with the driven element and a disengaged state in which the torque transmitting device 100 is delivers negligible or no torque—to the driven element. As alluded to above, axial movement of the indexer 110 relative to grooves 242 of the lock 130, together with rotational movement of the indexer 110, causes the indexer 110 to move along slides 244 (FIG. 7) formed in the lock 130. Thus, the torque transmitting device 100 may be reconfigured from the disengaged state to the engaged state by axial movement of the indexer 110 as pressure is applied to piston 122, and by rotational movement of the indexer 110 subsequent to reduction of the pressure and the attendant deactivation of the piston 122.

Figure 9:
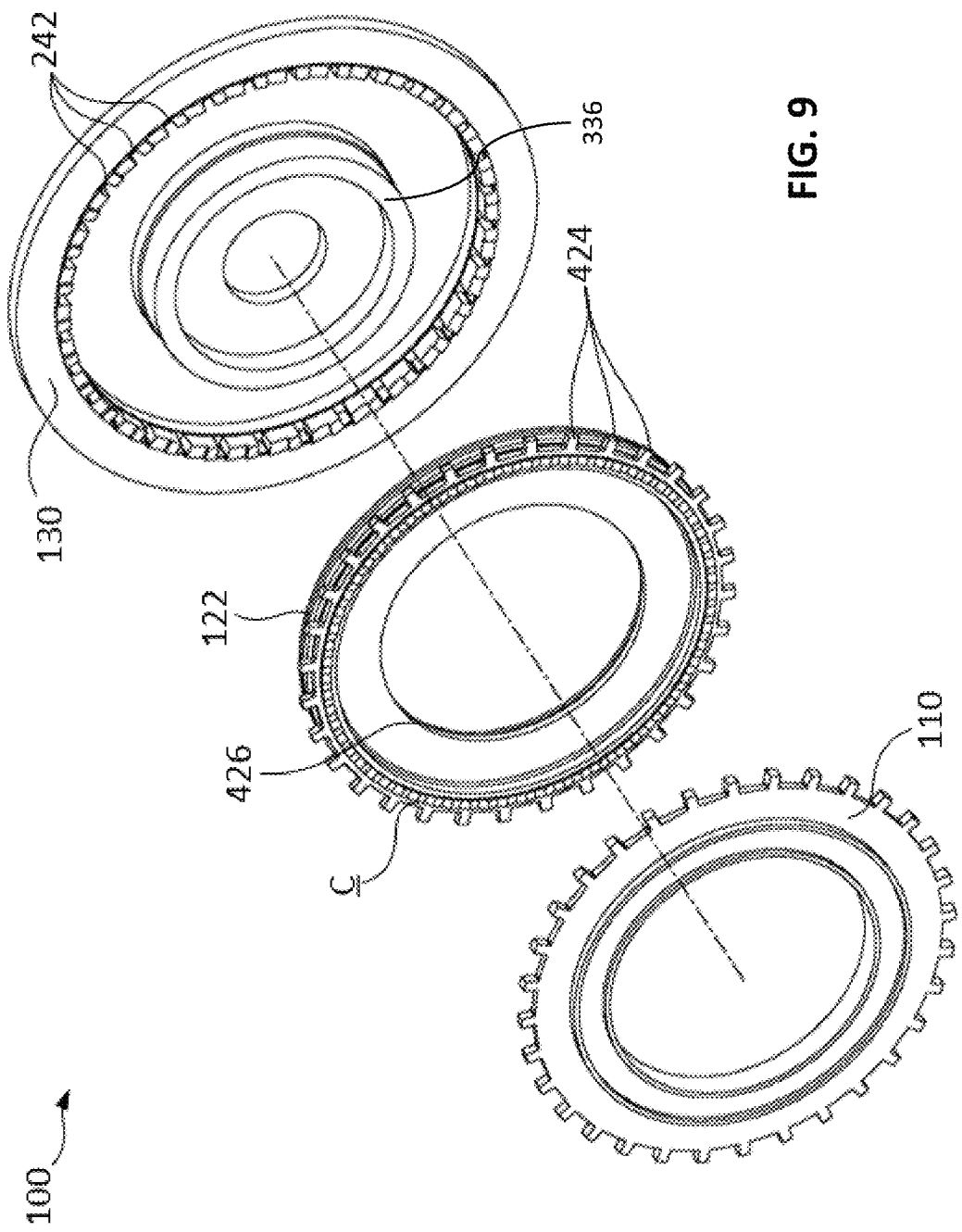
FIG. 9 is an exploded, front perspective view of the torque transmitting device of FIG. 8.
Figure 10:
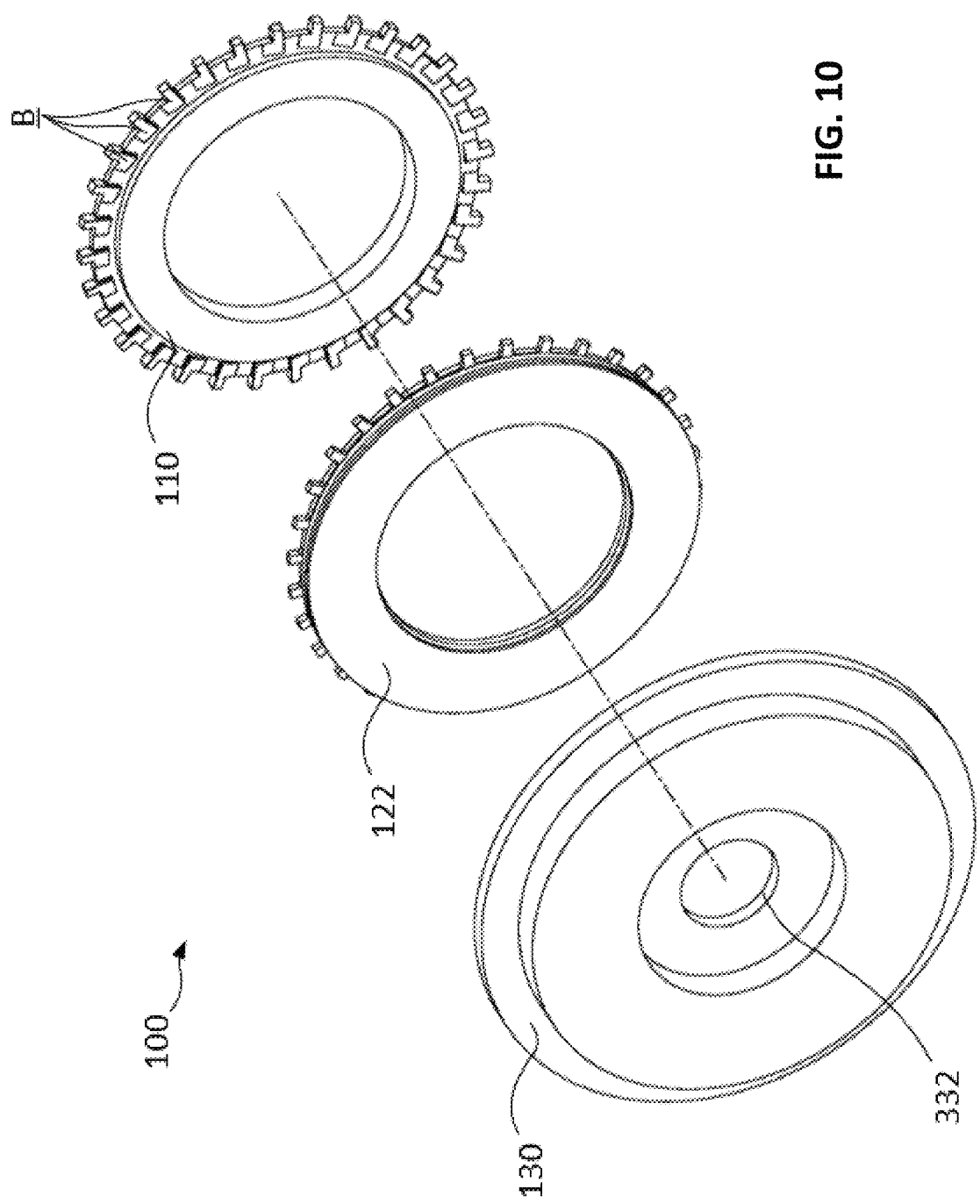
FIG. 10 is an exploded, rear perspective view of the torque transmitting device of FIG. 8.

FIG. 9 shows an exploded, perspective view of the torque transmitting device 100 facing forward (e.g., viewing the engine-side surfaces of the components thereof). FIG. 10 shows an exploded, perspective view of the torque transmitting device 100 facing aft (e.g., viewing the transmission-side surfaces of the components thereof). As best seen in FIG. 9, the piston 122 is a gear with teeth 424 that correspond to grooves 242 in the lock 130 and a central piston bore 426 that extends axially through the piston 122 and that is sized to be received over the shoulder 336 of the lock 130. When the teeth 424 of piston 122 are interfitted or meshed within the grooves 242, the piston 122 is rotationally fixed to the lock 130.

Force used to operate the torque transmitting device 100 (e.g., to move the piston 122 and thereby move the indexer 110) may be developed by hydraulic pressure placed upon piston 122. Each stage discussed above may be selectable via applying hydraulic pressure as commanded by a control circuit 26 (FIG. 2), which may be integrated into the transmission. The torque transmitting device 100 may have hydraulic fluid (e.g., an incompressible fluid such as oil) as a working fluid. The actuator may include a hydraulic pump 150 (FIGS. 3-5) configured to pressurize the hydraulic fluid, and the piston 122 may be operatively connected to the hydraulic pump and positioned to be acted upon by the fluid pressure.

If the control circuit 26 (FIG. 2) issues a piston-actuation signal, the hydraulic pump 150 responds by applying a hydraulic pressure to the piston 122. In applying pressure to the piston 122 during operation, a cavity behind piston 122 within torque transmitting device 100 may be filled with working fluid such that piston 122 is moved to the right against the biasing force of biasing member 140. The hydraulic pump 150 is therefore configured to apply a hydraulic pressure to the first side of the piston 122, but also to remove the hydraulic pressure from the first side of the piston 122 upon a signal from the controller 26. Upon application or relief of such hydraulic pressure, axial movement of the piston 122 occurs relative to the lock 130 as described in detail above. As the piston 122 moves relative the lock 130, it may also move the indexer 110 as also described above.

In operation, the lock 130 may facilitate transmitting rotational movement of the driving element to the driven element, or arresting rotation of a driven element as described herein. In the illustrated embodiment of FIG. 6, for example, the lock 130 is creates an operable connection that selectively grounds (e.g., fixes) or allows transmission of power from the power source 4 (FIG. 1) or another driving element. In the context of a vehicle, the driving element may be a drive shaft of a drive unit such as power source 4, which may be an electric motor or an internal combustion engine as noted above.

Turning to FIG. 8 and with reference to a torque-transmission application (FIGS. 1 and 2), a central lock bore 332 may be operatively received at the drive shaft such that the lock 130 (FIG. 8) rotates along with the drive shaft. In embodiments, the central lock bore 332 may include splines complementing mating splines in the drive shaft, or the connecting surface may be otherwise rotatably fixed to the drive shaft. As discussed in further detail above, the lock 130 is configured to movably receive the piston 122 and the indexer 110, and is configured to mesh with the indexer 110.

This configuration allows the indexer 110 to move between the engaged state and the disengaged state when the hydraulic pump applies the hydraulic pressure to the first side of the piston 122, and also to mechanically hold the indexer 110 in the engaged state subsequent to the hydraulic pump removing the hydraulic pressure. In the illustrated embodiment, both the piston 122 and the indexer 110 may be rotatably received within a bore formed in the lock 130 but also axially moveable within the bore, such that piston 122 and the indexer 110 are not directly connected to the drive shaft. Through the arrangement discussed above, however, the piston 122 and the indexer 110 may be selectively rotatably coupled to the lock 130 for common rotation with the driveshaft in engaged configurations.

An overstroke operation may be used to move the indexer 110 into further engagement with the driven element. In embodiments, the hydraulic pressure applied to the first side of the piston 122 may include a first pressure and a second pressure subsequent to the first pressure, wherein the first pressure may be less than the second pressure. The first pressure may be used to advance the indexer 110 within the grooves of the lock 130 toward the driven element. For example, the first pressure may move the indexer 110 in a forwardmost portion of the grooves. Then, the second pressure that is higher than the first pressure may move the indexer 110 such that the teeth are fully outside of the grooves. In embodiments, the second pressure may cause the lock 130 to be actuated and mechanically hold the indexer 110 in a locked-engaged state as described herein. For example, after the second pressure is applied, the geometry of the lock 130 and indexer 110 may facilitate rotational movement of the indexer 110 now that its teeth are freed from the grooves, as also described herein.

Figure 11:
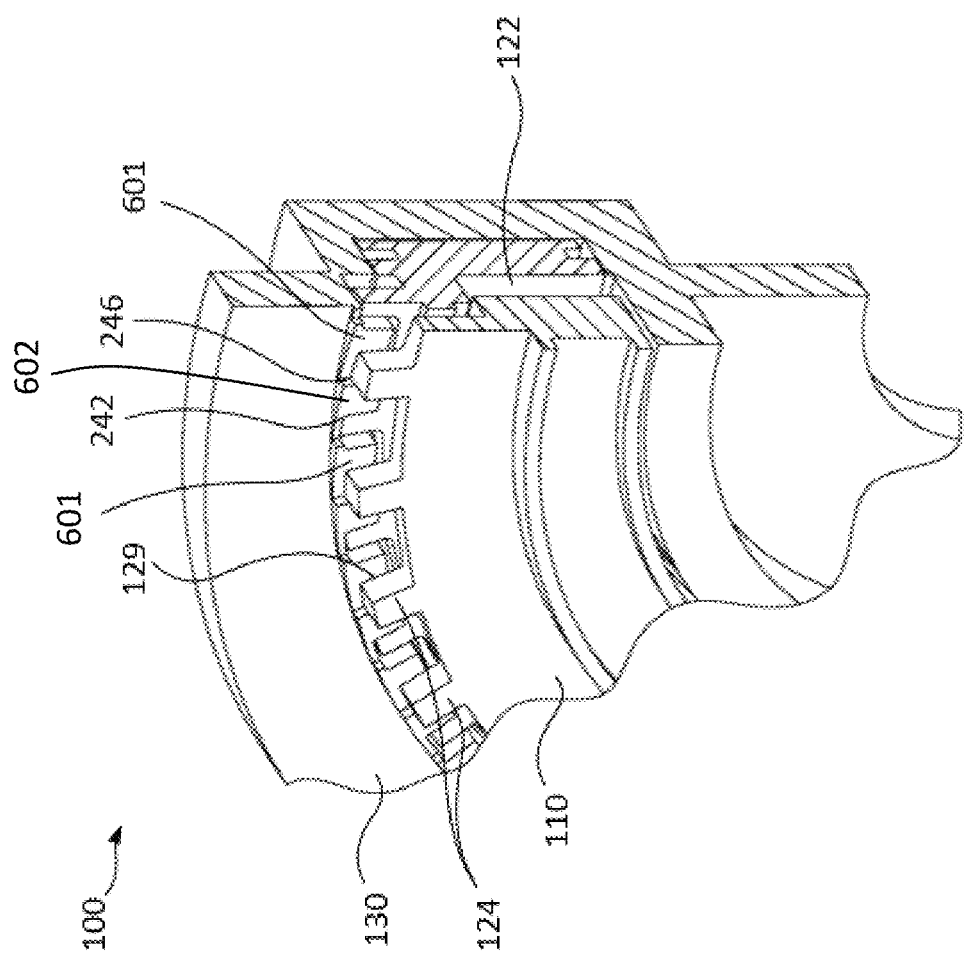
FIG. 11 shows a partial cutaway view of the torque transmitting device taken at section 11 of FIG. 8 according to embodiments of the present disclosure.

FIG. 11 shows a partial cutaway view of the torque transmitting device 100 taken at section 11 of FIG. 8, showing details of features which facilitate the selective mechanical interlocking of indexer 110 and lock 130 for the locked-engaged state of the torque transmission device 100 (as also shown and described with respect to FIG. 5).

Geometry in portions of the lock 130 and a biasing member may facilitate mechanically holding the indexer 110 in the locked-engaged state. In the illustrated embodiment of FIG. 11, the lock 130 includes an annular toothed cam surface to selectively rotatably fix the indexer 110 and the lock 130. With reference to FIG. 11, this toothed cam surface may include a series of catches 246 and a series of first slides 601, 602 each adjacent to a respective catch 246. Slides 601, 602 may have identical function to slides 244 shown and described above with respect to FIG. 7. Each catch 246 is configured to receive one of the teeth 124 of the indexer 110 to thereby mechanically hold the indexer 110 in the engaged state, and the each slide 601, 602 may be configured to guide the teeth 124 of the indexer 110 into the catch 246. In particular, FIG. 11 illustrates an aft surface 129 a tooth 124 that is angled to gradually extend more aft as it follows the surface of the abutting slide 601, which gradually recedes at an angle complementary to the angle of the aft surface 129 of the tooth 124. The first slide 601 may terminate at the catch 246 in the form of a sidewall that forwardly extends from a terminal end of the first slide 601, such that the sidewall forms a barrier to rotation of indexer 110 when a tooth 124 abuts the sidewall.

In one embodiment, the aft surface 129 of the teeth 124 may have an angle similar or identical to those ridges B shown in FIG. 10 and discussed herein. For example, the aft surface 129 may be an extension radially outward of the first series of ridges B in the indexer 110, as illustrated in FIG. 10.

Referring still to FIG. 11, the toothed cam surface may include a second slide 602. The second slide 602 may be similar or identical to the first to the first slide 601, in that the second slide 602 defines an angular surface which gradually recedes such that the second slide 602 can complementarily receive the aft surface 129 of one of teeth 124. Unlike slides 601, the second slides 602 each terminate at an intersection with the grooves 242 of the lock 130. However, slide 602 is angularly spaced along the annular toothed cam surface of the indexer 110 relative to slide 601, such that one of teeth 124 can engage one slide 602 simultaneously with another one of teeth 124 engaging the next slide 602. In the illustrated embodiment, additional slides 601, 602 may be provided around the entire annular extent of the toothed cam surface and are spaced to simultaneously engage a corresponding series of teeth 124 around the entire periphery of indexer 110. There may be fewer teeth 124 than slides 601, 602, such as one tooth 124 for every pair of slides 601 or 602, as illustrated.

In embodiments, the torque transmitting device 100 may include a biasing member 140 (e.g., a disc spring pack shown in FIG. 6, or any other suitable biasing member) configured to urge the indexer 110 to retain a meshed or interfitted engagement with the lock 130 as the indexer 110 moves between an engaged state and a disengaged state. For example, the biasing member 140 may bias the indexer 110 in the aft (e.g., transmission-side) direction to thereby urge maintained contact between the aft surfaces 129 of the teeth 124 and the lock 130 as the aft surfaces 129 of the teeth 124 travel along the slides 601, 602 and are received in respective catches 246.

Embodiments of the present disclosure include a park system for a vehicle. For example, transmission 10 may include a plurality of torque transmitting devices each of which is similar to those disclosed herein, including the torque transmitting device 100. Each torque transmitting device 100 in the plurality of torque transmitting devices may operate separately or in tandem. In embodiments, at least two torque transmitting devices 100 may be used to achieve a park configuration for transmission 10, by entering respective locked-engaged states (FIG. 5) which work to keep the output shaft the transmission from turning in the absence of a driving force from power source 4 (FIG. 1). For example, when the transmission is shifted into park, control circuit 26 (FIG. 2) may place two torque transmitting devices 100 in the locked-engaged state, which may then remain in such locked-engaged state even when the hydraulic pump 150 (FIGS. 3-5) is deactivated upon vehicle shutdown. In such embodiments, the need for other components such as a parking pawl found in typical transmissions, may be eliminated.

In embodiment, torque transmitting device 100 may further include sensor target teeth can be added to the indexer 110 to allow detection of mechanical lock or unlock state. For example, one or more of the teeth 124 may be modified or otherwise made suitable to be detected by a sensor (not shown) when teeth 124 are either receive within, or outside of, pocket 242. In addition, the sensor may detect whether the teeth 124 are positioned to engage catches 246 (as in the locked-engaged configuration), or are extended beyond catches 246 (as in the fluid-engaged configuration). Thus, the sensor may issue a signal to the control circuit 26 (FIG. 2) indicative of whether teeth 124 of indexer 110 are engaged within respective pockets 242, and therefore whether indexer 110 is in the disengaged configuration (FIG. 3), the fluid-engaged configuration (FIG. 4), or the lock-engaged configuration (FIG. 5).

Figure 12:
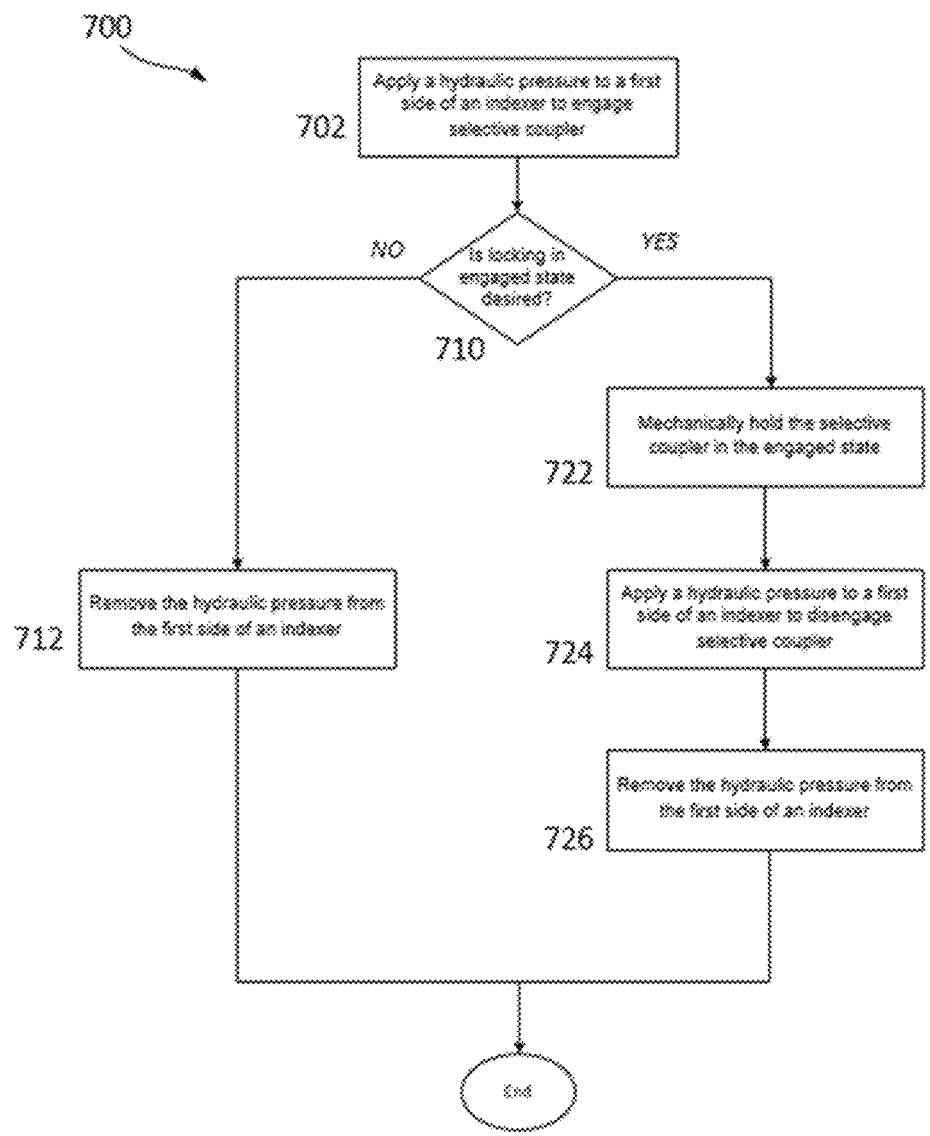
FIG. 12 is a flowchart of a method for applying a torque transmitting device in a transmission according to embodiments of the present disclosure.
Figure 13:
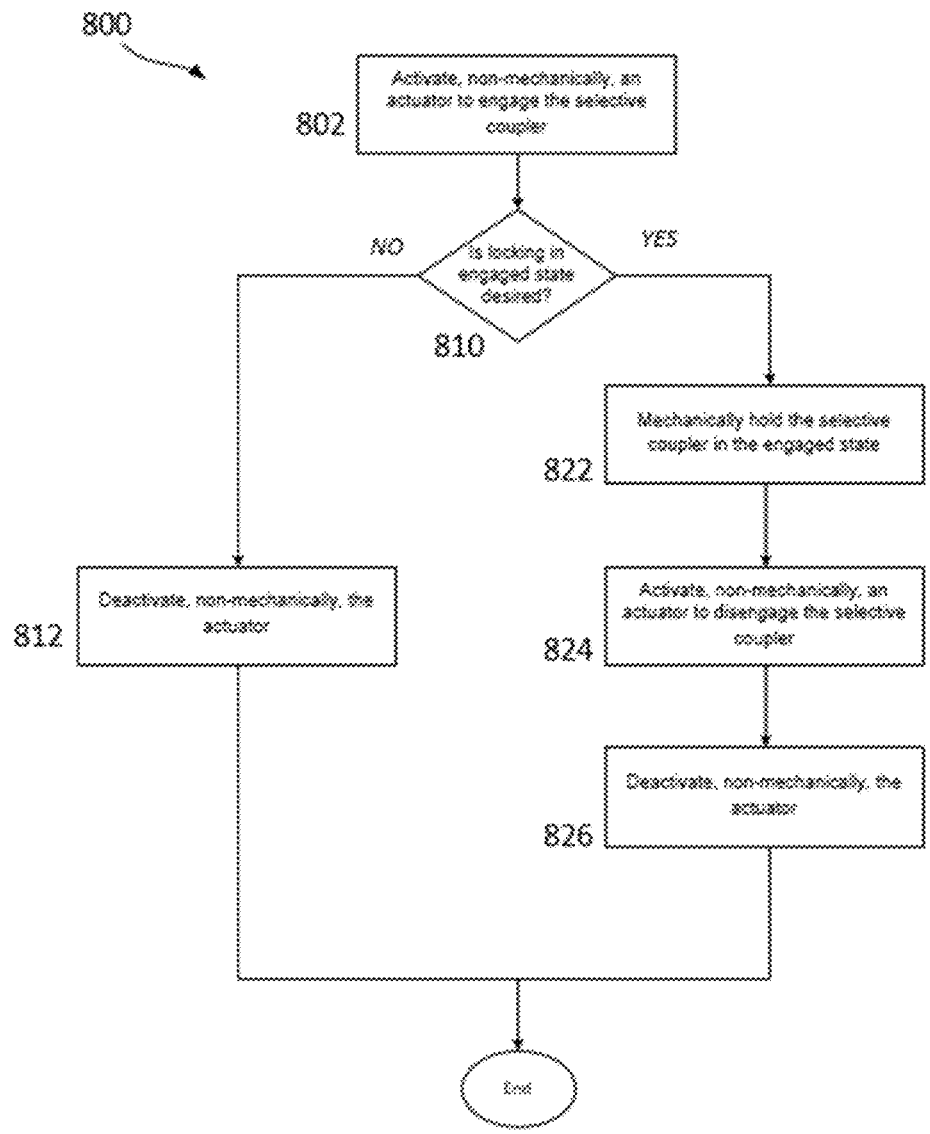
FIG. 13 is a flowchart of a method for applying a torque transmitting device in a transmission according to embodiments of the present disclosure.

FIGS. 12 and 13 show various methods of the present disclosure. FIG. 12 shows a flowchart of a method for applying a torque transmitting device in a transmission according to embodiments of the present disclosure. FIG. 13 shows a flowchart of another method for applying a torque transmitting device in a transmission according to embodiments of the present disclosure. It should be understood that the steps of the method may be applied in any order or repeated without departing from the scope of this disclosure.

Turning to FIG. 12, a method 700 for applying a torque transmitting device in a transmission is depicted. At step 702, the method 700 includes applying a hydraulic pressure to a first side of an indexer to transition the torque transmitting device from a disengaged state to an engaged state, e.g., a fluid-engaged state as shown in FIG. 4 and described above. At step 710, the method 700 determines if locking in the engaged state is desired. If not, the method 700 continues to step 712 where the method 700 includes removing the hydraulic pressure from the first side of the indexer. Then the method 700 ends. But if locking in the engaged state is desired at step 710, the method 700 may continue to step 722.

In continuing the method 700, at step 722, the method 700 mechanically holds the torque transmitting device in the engaged state subsequent to removing the hydraulic pressure from the first side of the indexer. This is a locked-engaged state, as depicted in FIG. 5. At step 724, the method 700 may include applying the hydraulic pressure to the first side of the indexer to transition the torque transmitting device from the locked-engaged state to the disengaged state and, at step 726, removing the hydraulic pressure subsequent to the torque transmitting device moving from the engaged state toward the disengaged state. Then the method 700 ends.

As also described above, the method 700 may include an overstroke operation to move the indexer into further engagement with the driven element. As such, in embodiments, applying the hydraulic pressure may include causing a first pressure and a second pressure subsequent to the first pressure, wherein the first pressure may be less than the second pressure. For example, the first pressure may move the indexer in a forwardmost portion of the grooves. Then, the second pressure that is higher than the first pressure may move the indexer such that the teeth are just outside of the grooves.

As discussed further above, the second pressure may allow the lock and indexer reconfigure to mechanically hold the engaged state, also referred to herein as a "locked-engaged" state. In embodiments, the indexer may be positioned differently when in the locked-engaged position than when in the unlocked position. For example, the indexer may be free to move axially and constrained rotationally within the grooves of the lock when in the unlocked position. After the second pressure is applied, the geometry of the lock may facilitate rotational movement of the indexer now that its teeth are freed from the grooves. In embodiments, mechanically holding the torque transmitting device in the engaged state subsequent to removing the hydraulic pressure from the first side of the indexer may include allowing the indexer to move from an unlocked position in which movement of the indexer may be allowed to a locked position in which movement of the indexer may be inhibited. For example, when the indexer is in the locked position, indexer may be constrained axially between the disc spring pack and the slides and may be constrained rotationally by the catches.

In addition to being different operations of the pump, applying and removing pressure may coincide with activation and deactivation of a fluid pump, such as hydraulic pump 150 (FIGS. 3-5). As such, the present disclosure may include a method 800 for applying a torque transmitting device in a transmission. At step 802, the method activates, non-mechanically, an actuator to transition the torque transmitting device from a disengaged state to an engaged state. This is the fluid-engaged state of FIG. 4. In embodiments, activating, non-mechanically, the actuator to transition the torque transmitting device from the disengaged state to the engaged state may include activating a hydraulic pump, such as pump 150 (FIG. 4). At step 810, the method 800 may include determining if locking in the engaged state is desired. If not, the method 800 continues to step 812 where the method may include deactivating, non-mechanically, the actuator. For example, the pump may be activated or deactivated electrically via a control circuit 26 (FIG. 2) to effect deactivation of the actuator. Then the method may end. On the other hand, if locking in the engaged state is desired at step 810, the method 800 may continue to step 822. In such embodiments, activating the hydraulic pump may include actuating the hydraulic pump to operate at a first pressure and a second pressure subsequent to the first pressure, wherein the first pressure may be less than the second pressure.

In continuing the method 800, at step 822, the method may include mechanically holding the torque transmitting device in the engaged state subsequent to deactivating, non-mechanically, the actuator. This is the "locked-engaged" shown in FIG. 4 and discussed herein. In embodiments, at step 824, the method may include activating, non-mechanically, the actuator to transition the torque transmitting device from the engaged state to the disengaged state and, at step 826, deactivating, non-mechanically, the actuator subsequent to the torque transmitting device moving from the engaged state to the disengaged state. Then the method 800 may end.

Various modifications and additions may be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A torque transmitting device for transmitting torque from a driving element to a driven element, the torque transmitting device comprising:
    an indexer configured to move between an engaged state in which the torque transmitting device is engaged with the driven element and a disengaged state in which the torque transmitting device is disengaged with the driven element;
    an actuator comprising a hydraulic pump and a piston operatively connected to the hydraulic pump, the hydraulic pump being configured to selectively apply a hydraulic pressure to a first side of the piston such that the piston moves the indexer between the engaged state and the disengaged state;
    a lock operatively connected to the indexer, the lock engaging the indexer in a first configuration corresponding to the engaged state of the indexer and the lock engaging the indexer in a second configuration corresponding to the disengaged state, the first configuration being different from the second configuration; and
    a biasing element configured to provide a biasing force to move the indexer into the engaged state, such that the biasing element is operable to mechanically hold the indexer in the engaged state absent the hydraulic pressure.

2. The torque transmitting device of claim 1, wherein the indexer and the piston are movably received in the lock.

3. The torque transmitting device of claim 1, wherein the piston is configured to move toward the driven element when the hydraulic pump applies the hydraulic pressure to the first side of the piston, and to move away from the driven element when the hydraulic pressure is relieved from the first side of the piston.

4. The torque transmitting device of claim 1, wherein the torque transmitting device is transitioned from the disengaged state to the engaged state by axial movement of the indexer under a force transmitted by the piston when the hydraulic pressure is applied, the torque transmitting device is retained in the engaged state by rotational movement of the indexer under the biasing force of the biasing element absent the hydraulic pressure.

5. The torque transmitting device of claim 4, wherein the hydraulic pressure comprises a first pressure and a second pressure subsequent to the first pressure, wherein the first pressure is less than the second pressure, the first pressure sufficient to overcome the biasing force of the biasing element when the indexer is in the disengaged state, and the second pressure sufficient to disengage the indexer from the lock and thereby allow the rotational movement of the indexer.

6. The torque transmitting device of claim 4, wherein the second pressure is sufficient to place the indexer in a fluid-engaged state.

7. The torque transmitting device of claim 1, wherein the relief of the second pressure cooperates with the rotational movement of the indexer to place the indexer in a locked-engaged state absent the hydraulic pressure.

8. The torque transmitting device of claim 1, wherein the lock comprises a toothed cam surface and the indexer comprises a tooth configured to interfit with the toothed cam surface to form a rotational lock between the lock and the indexer.

9. The torque transmitting device of claim 8, wherein the toothed cam surface comprises a catch and a first slide, the catch configured to receive the tooth of the indexer to thereby mechanically hold the indexer in the engaged state, and the first slide configured to guide the tooth of the indexer into the catch.

10. A method for applying a torque transmitting device in a transmission, the method comprising:
    applying a hydraulic pressure to a first side of an indexer to transition the torque transmitting device from a disengaged state to a fluid-engaged state activated by the hydraulic pressure;
    removing the hydraulic pressure from the first side of the indexer; and
    mechanically holding the torque transmitting device in a locked-engaged state subsequent to removing the hydraulic pressure from the first side of the indexer by allowing the indexer to move from an unlocked position in which rotation of the indexer is allowed to a locked position in which rotation of the indexer is inhibited.

11. The method of claim 10, wherein the indexer comprises a transmission side and an engine side, and wherein the first side is the transmission side.

12. The method of claim 10, wherein the torque transmitting device is transitioned from the disengaged state to the fluid-engaged state by axial movement of the indexer in the direction of the hydraulic pressure when the hydraulic pressure is applied and rotational movement of the indexer subsequent to removing the hydraulic pressure.

13. The method of claim 10, wherein applying the hydraulic pressure comprises causing a first pressure sufficient to move the indexer and a second pressure sufficient to place the indexer in the fluid-engaged state, wherein the first pressure is less than the second pressure.

14. The method of claim 10, further comprising:
applying the hydraulic pressure to the first side of the indexer to transition the torque transmitting device from the locked-engaged state to the disengaged state; and
removing the hydraulic pressure subsequent to the torque transmitting device moving from the locked-engaged state to the disengaged state.

15. The method of claim 10, wherein the indexer is in a different rotational position when in the locked position than when in the unlocked position.

16. A method for applying a torque transmitting device in a transmission, the method comprising:
activating, non-mechanically, an actuator to move an indexer that transitions the torque transmitting device from a disengaged state to a first engaged state, wherein the actuator comprises a piston;
deactivating, non-mechanically, the actuator; and
mechanically holding the torque transmitting device in a second engaged state subsequent to deactivating, non-mechanically, the actuator.

17. The method of claim 16, wherein activating, non-mechanically, the actuator to transition the torque transmitting device from the disengaged state to the first engaged state comprises activating a hydraulic pump.

18. The method of claim 17, wherein activating the hydraulic pump comprises actuating the hydraulic pump to operate at a first pressure sufficient to move the actuator and a second pressure subsequent to the first pressure and sufficient to place the actuator in the first engaged state, wherein the first pressure is less than the second pressure.

19. The method of claim 16, further comprising:
activating, non-mechanically, the actuator to transition the torque transmitting device from the second engaged state to the disengaged state; and
deactivating, non-mechanically, the actuator as the torque transmitting device.

* * * * *